March 11, 1941.　　　　S. HERSHBERG　　　　2,234,345
CAMERA
Filed Aug. 27, 1937　　　8 Sheets-Sheet 1

INVENTOR.
SAMUEL HERSHBERG
BY Richard S. Temko
ATTORNEY.

March 11, 1941.  S. HERSHBERG  2,234,345
CAMERA
Filed Aug. 27, 1937  8 Sheets-Sheet 2

INVENTOR.
SAMUEL HERSHBERG
BY Richard S. Temko
ATTORNEY.

March 11, 1941.   S. HERSHBERG   2,234,345
CAMERA
Filed Aug. 27, 1937   8 Sheets-Sheet 5
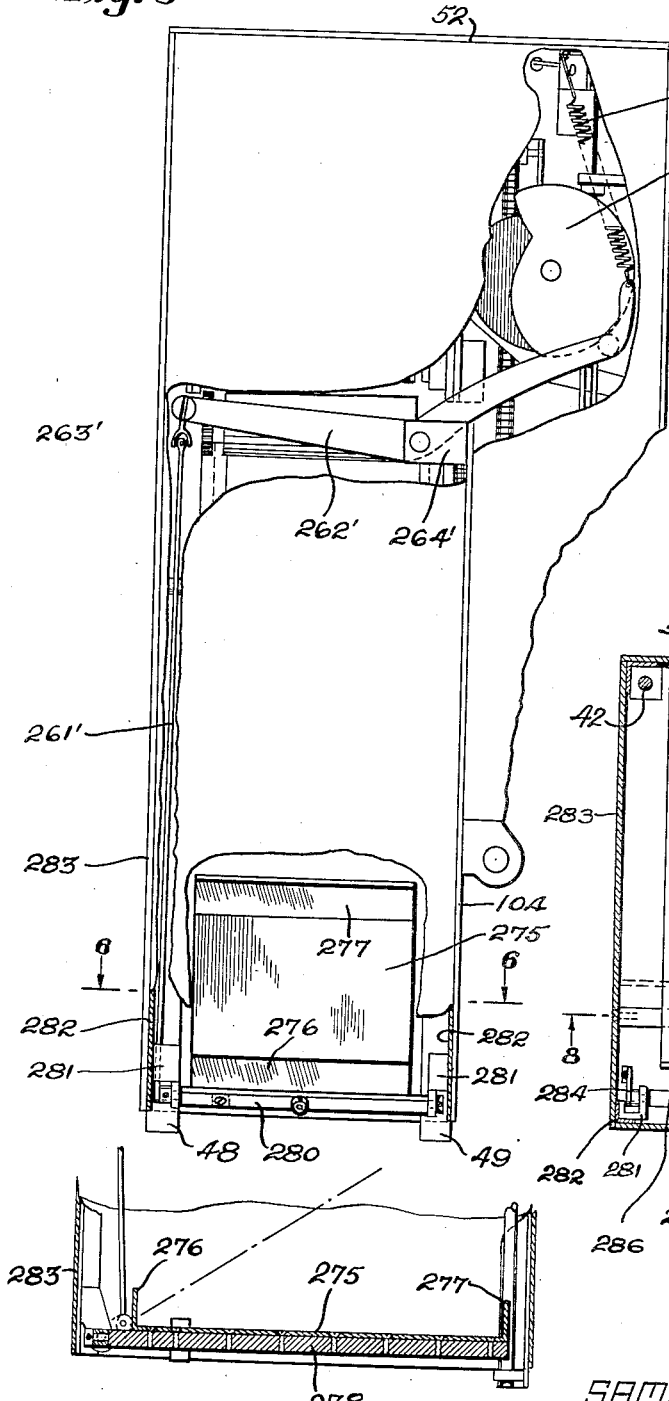
Fig. 5.
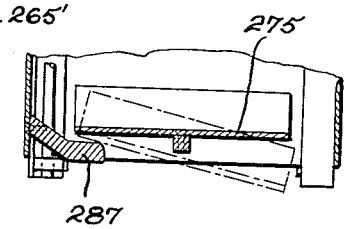
Fig. 8.
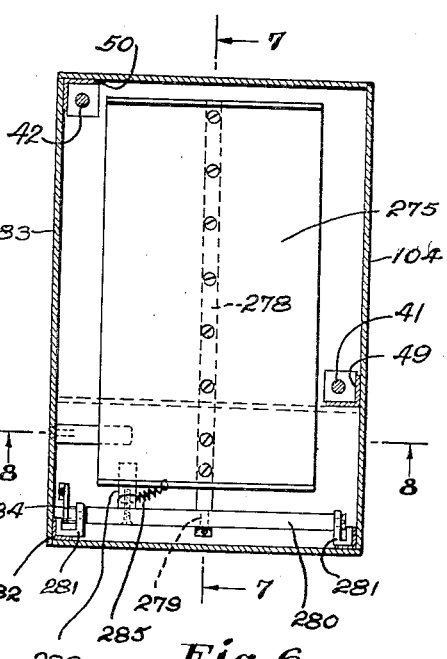
Fig. 6.
Fig. 7.
INVENTOR.
SAMUEL HERSHBERG
BY Richard S. Temko
ATTORNEY.

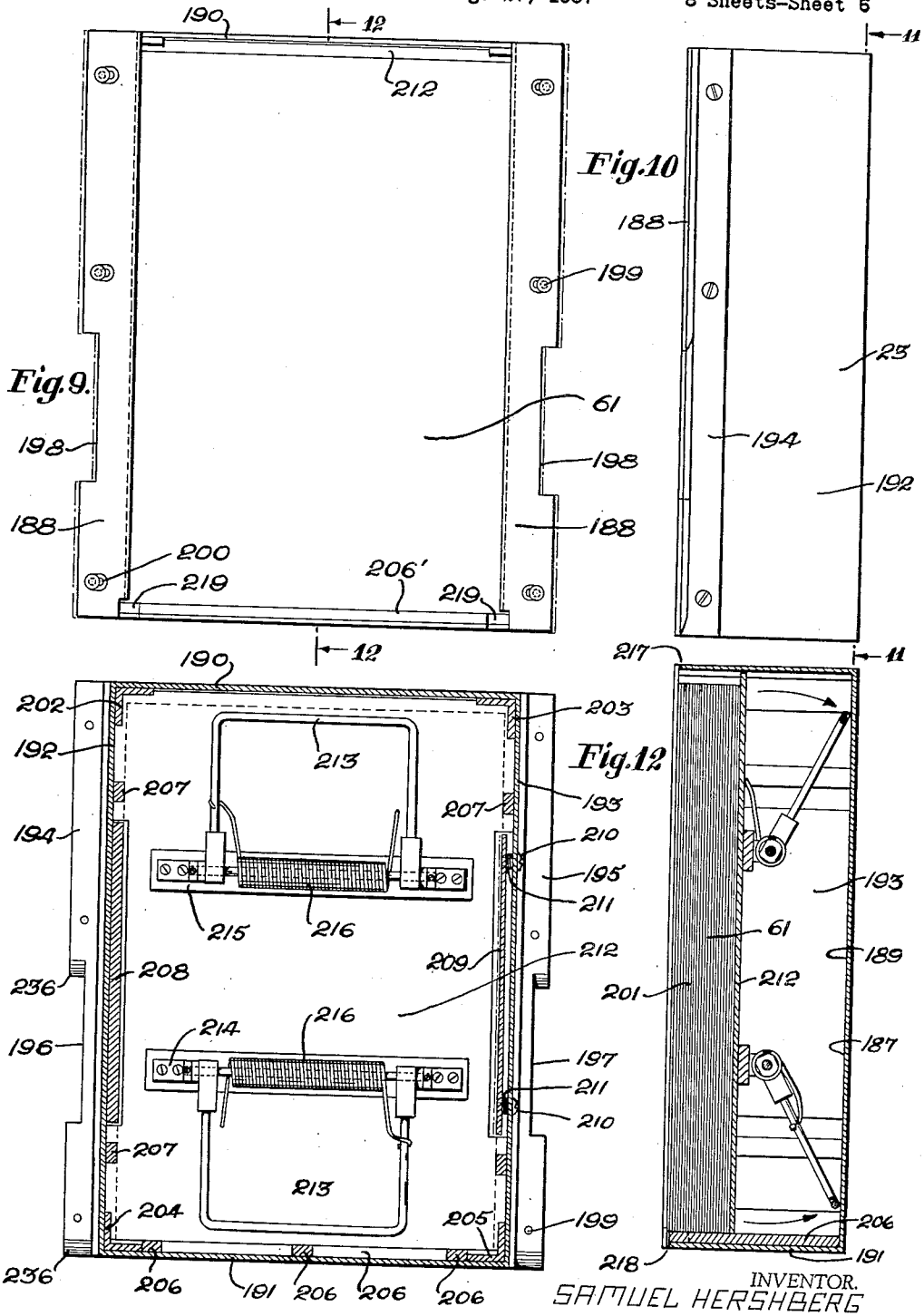

March 11, 1941.　　　　S. HERSHBERG　　　　2,234,345
CAMERA
Filed Aug. 27, 1937　　　8 Sheets-Sheet 7
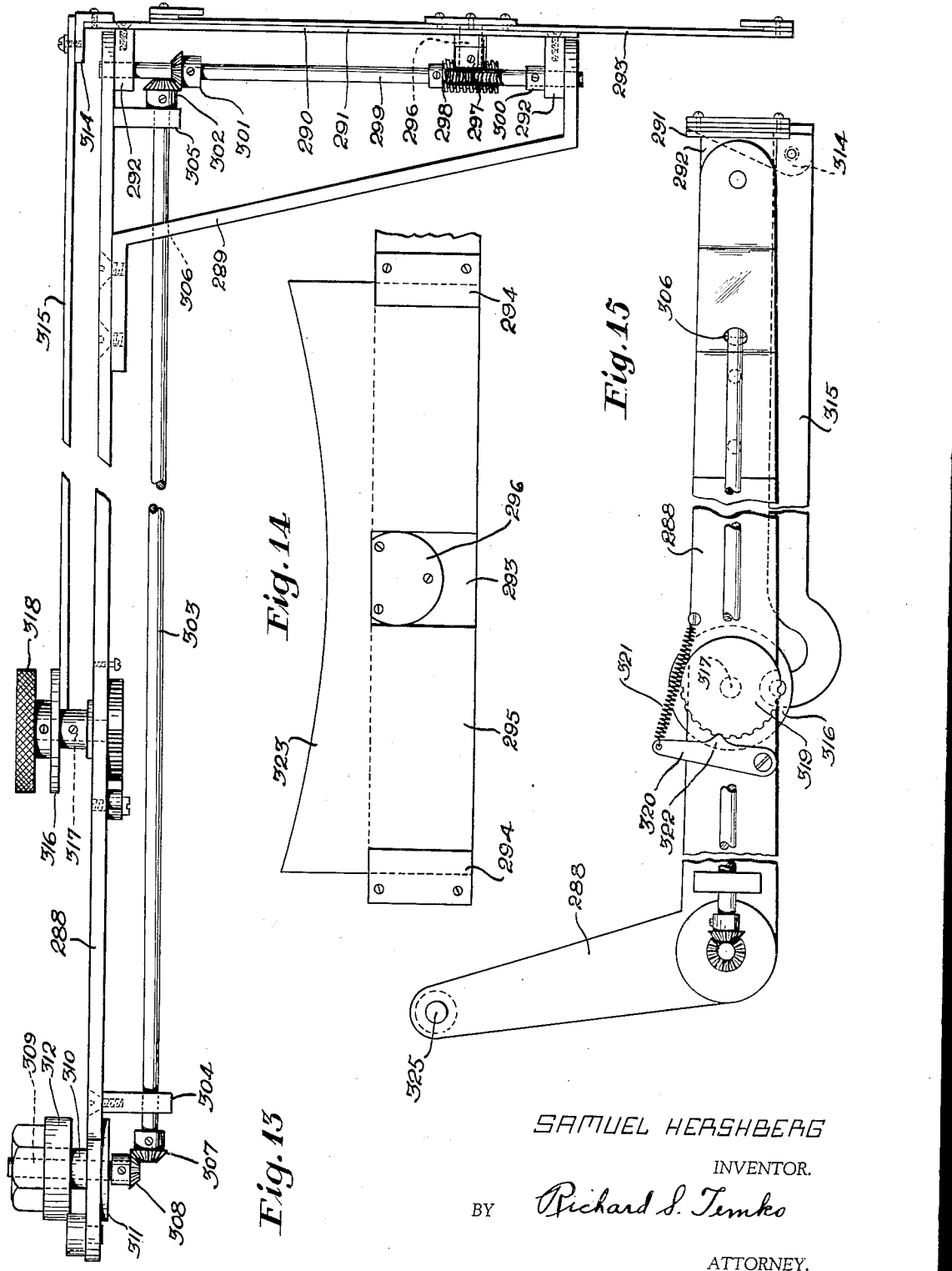
SAMUEL HERSHBERG
INVENTOR.
BY Richard S. Temko
ATTORNEY.

March 11, 1941.  S. HERSHBERG  2,234,345
CAMERA
Filed Aug. 27, 1937  8 Sheets-Sheet 8

INVENTOR.
SAMUEL HERSHBERG
BY Richard S. Temko
ATTORNEY.

Patented Mar. 11, 1941

2,234,345

UNITED STATES PATENT OFFICE 2,234,345

CAMERA

Samuel Hershberg, Brooklyn, N. Y.

Application August 27, 1937, Serial No. 161,300

13 Claims. (Cl. 95—42)

This invention relates to a camera structure especially suited for use in the system of photography embodied and described in your applicant's application for patent filed in the United States Patent Office on September 15, 1934, bearing Serial No. 744,225. The present camera structure, however, is also suited for use independently of such system or in conjunction with other automatic developing and lighting equipment.

This invention relates generally to photographic cameras and more particularly to a camera structure wherein the larger part of the functions of said camera are made automatic.

The main object of this invention is the provision of a photographic camera whereby an unskilled operator is enabled to produce a photograph of a quality comparable to that produced by a finished and experienced artisan, and whereby a skilled and experienced artisan is enabled to produce more photographs in a given amount of time and of a better quality than heretofore, owing to a substantial reduction in the manual manipulation of the focusing and adjustment of said camera.

A further object of this invention is the provision of a camera wherein a real image in contradistinction to a virtual or distorted one is transmitted to the sensitized material therein so that said sensitized material by proper chemical reversal may become a finished positive photograph.

Another object of the invention is the provision of a camera wherein the structure is so designed that it permits of operation which will be more economical by virtue of the compact arrangement of the various mechanisms thereof; the use of less expensive sensitized material such as highspeed paper instead of film; the saving of labor with the reduction in manual operation of the camera and the substitution therefor of automatic operations; and the production of a higher average of perfect prints, the result of proper composition, accurate exposure, and sharp focusing.

A further feature of this invention resides in the elimination of guesswork in composition and exposure and the substitution therefor of a predetermined scientific technique.

Among the objects of the present invention is the provision of a camera structure wherein a pair of sliding mirrors of high reflecting and low diffracting power automatically initiate the exposure as the exposing mirror moves into position for projecting the image of the sitter on the focal plane and the exposing mirror in the exposing position thereof affords the conversion of a virtual image to a real image on the sensitized paper located in the focal plane.

These objects enumerated and other important objects, advantages and incidental features of the invention will be more fully delineated in the following description and pointed out in the appended claims.

In accordance with the drawings and the several views thereof, right and left hand designations refer to the relative position of the operator standing at the rear of the camera and facing the subject.

Figure 2:
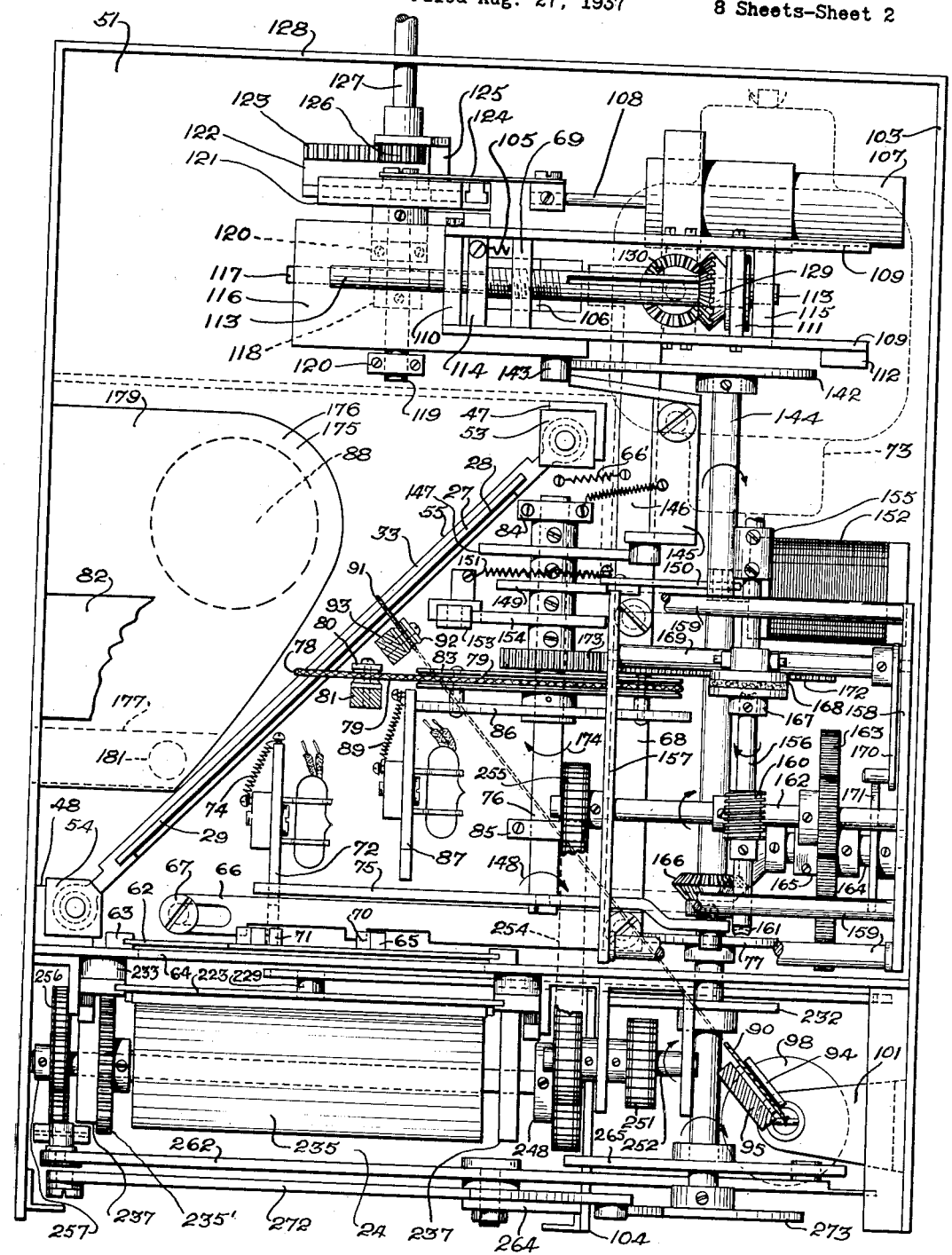

Figure 2 is a plan view showing a portion of the operating mechanism of the camera, the upper cover plate and the bellows casing having been removed. The forward limit of the area displayed in this view is indicated by the dot dash line in Figure 3. In Figure 2 the rear of the camera is at the left, and the left side of the camera is shown at the top of the drawing.

Figures 1, 1A:
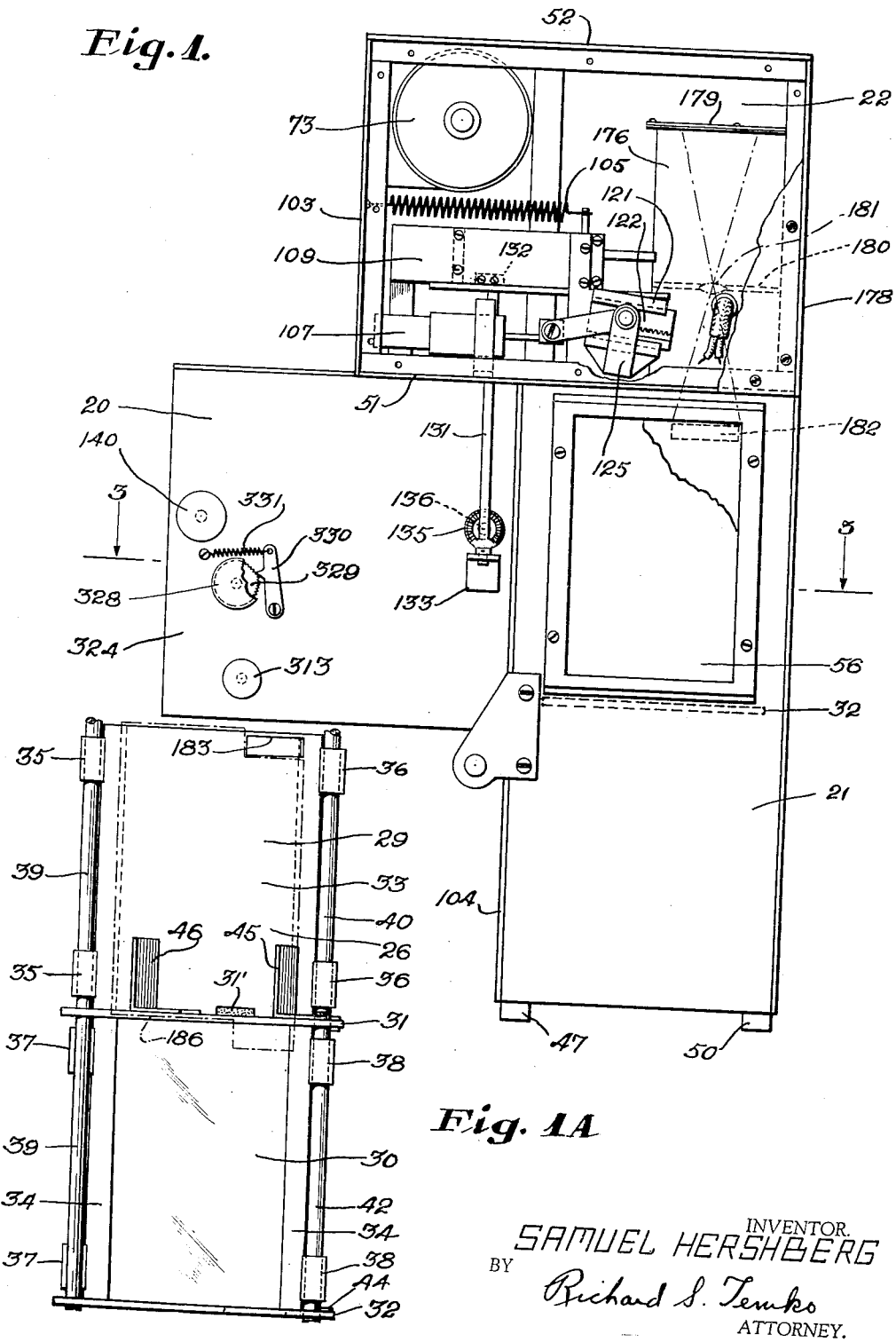
Figure 1 is a left side elevational view of the camera with a portion of the outside casing removed to show concealed mechanism. In this view the vignetter has been removed.
Figure 1A is a fragmentary left side elevational view showing the mirror unit.
Figure 3:
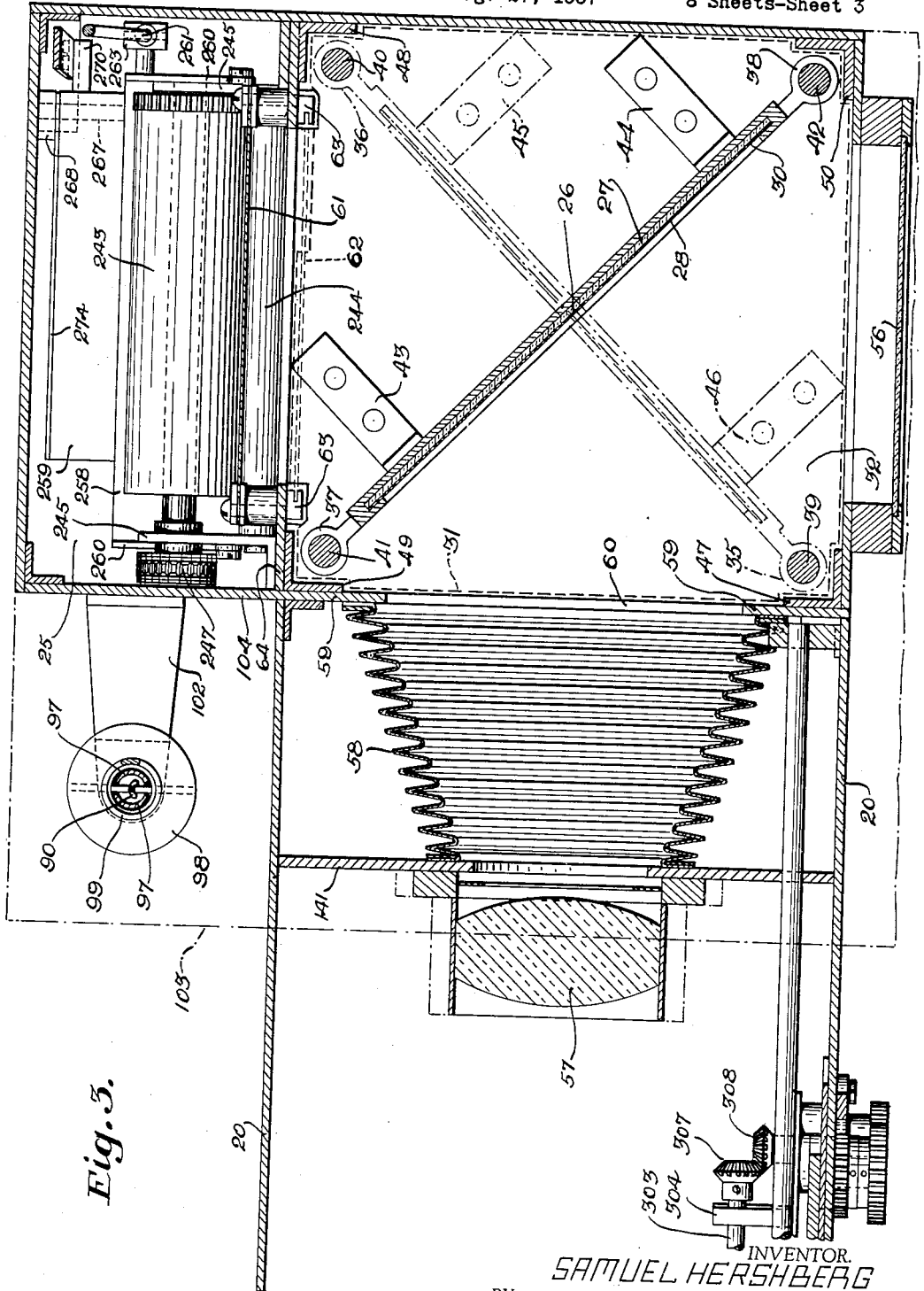

Figure 3 is a horizontal sectional view as taken along the plane 3—3 on Figure 1. A portion of the bellows casing and vignetter operating mechanism is broken away at the lower left hand corner of this figure.

Figure 4:
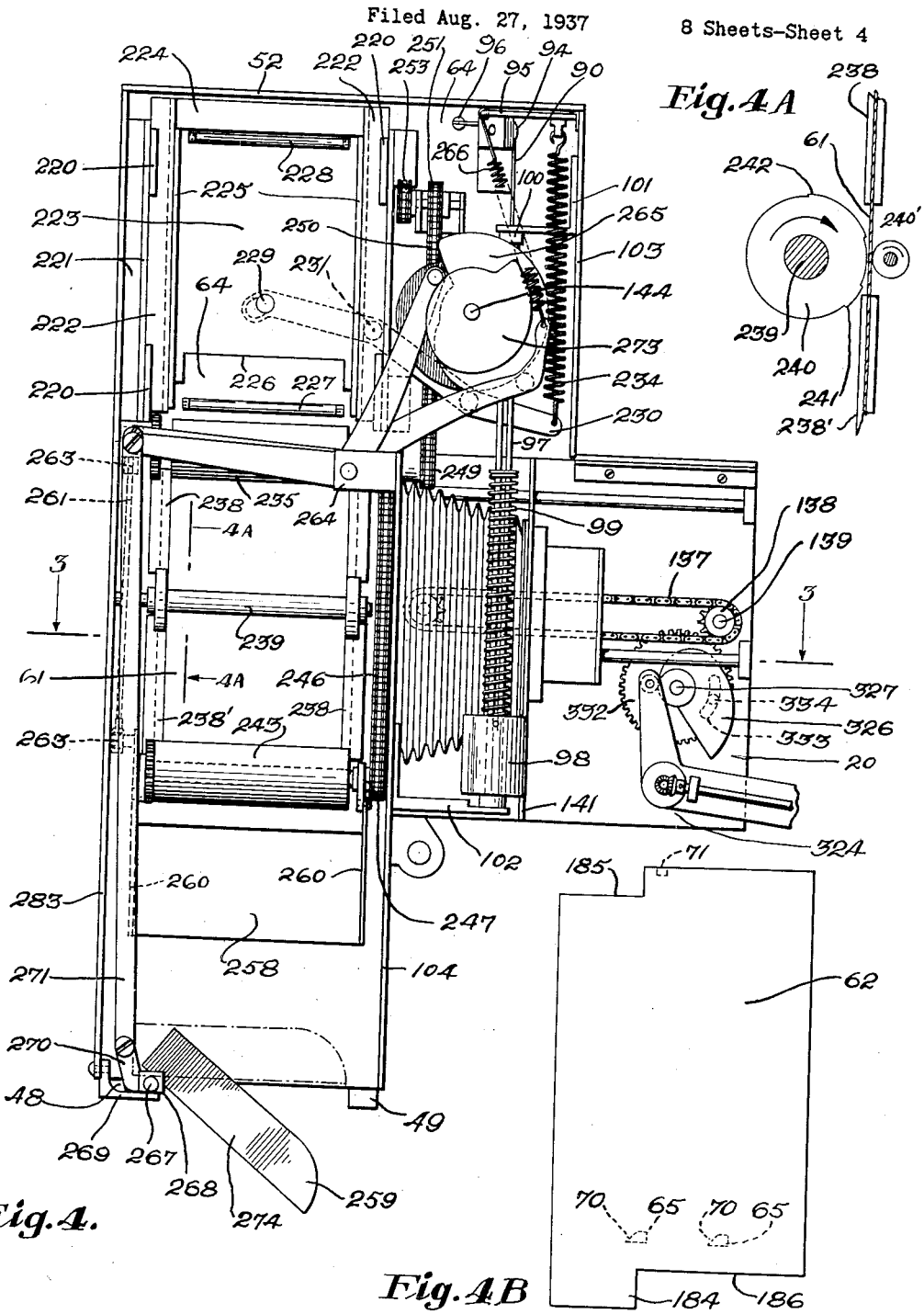

Figure 4 is a right side elevational view with all of the right side cover plates removed to show the operating parts. A portion of the vignetter mechanism is broken away and the sensitized material magazine is removed. In this figure one embodiment of the mechanism for discharging the exposed sheet on to the conveying belt of an automatic developing machine is shown.

Figure 4A is a fragmentary sectional view of Figure 4 along the plane 4A—4A thereon.

Figure 4B is an elevational view of the shutter plate slightly enlarged, and in a position it would occupy in Figure 4 if it were visible in the latter figure.

Figure 5 is a fragmentary right side elevational view taken similarly to Figure 4, with portions of the cover plate broken away to show another embodiment of the mechanism for discharging the exposed sheet on to the conveying belt of an automatic developing machine. In this view the discharging shelf is shown in the "up" position thereof, which is the normal position of said shelf for receiving an exposed sheet of sensitized material.

Figure 6 is a horizontal section as viewed from the plane 6—6 on Figure 5. In this view the discharging shelf is in a horizontal position just prior to the actual discharging of an exposed sheet, and said shelf is therefor shown in plan view.

Figure 7 is a vertical sectional view as seen from the plane 7—7 on Figure 6. On this figure the normal exposed sheet receiving angle of the discharging shelf is indicated by the dot dash line thereon.

Figure 8 is a vertical sectional view as seen from the plane 8—8 on Figure 6. In this figure the position taken by the discharging shelf during the actual discharge of an exposed sheet is indicated by dot dash lines.

Figure 9 is a front elevational view of the sensitized paper magazine. The magazine is here shown appears as it would be seen looking toward it from the camera.

Figure 10 is a side elevational view of Figure 9 as seen from the right side of Figure 9.

Figure 11 is a vertical sectional view of Figure 10 as seen from the plane 11—11 thereon.

Figure 12 is a vertical sectional view as seen from the plane 12—12 on Figure 9.

Figure 13 is a plan view of the vignetting device as removed from the bellows casing, certain of the parts being broken for the purpose of clarity.

Figure 14 is a fragmentary vertical elevational view of Figure 13 as viewed from the right side of said figure, showing the removable vignetting plate in position.

Figure 15 is a vertical elevational view of Figure 13 as seen from the lower portion of Figure 13. Several of the parts have been broken for the purpose of clarity.

Figure 16:
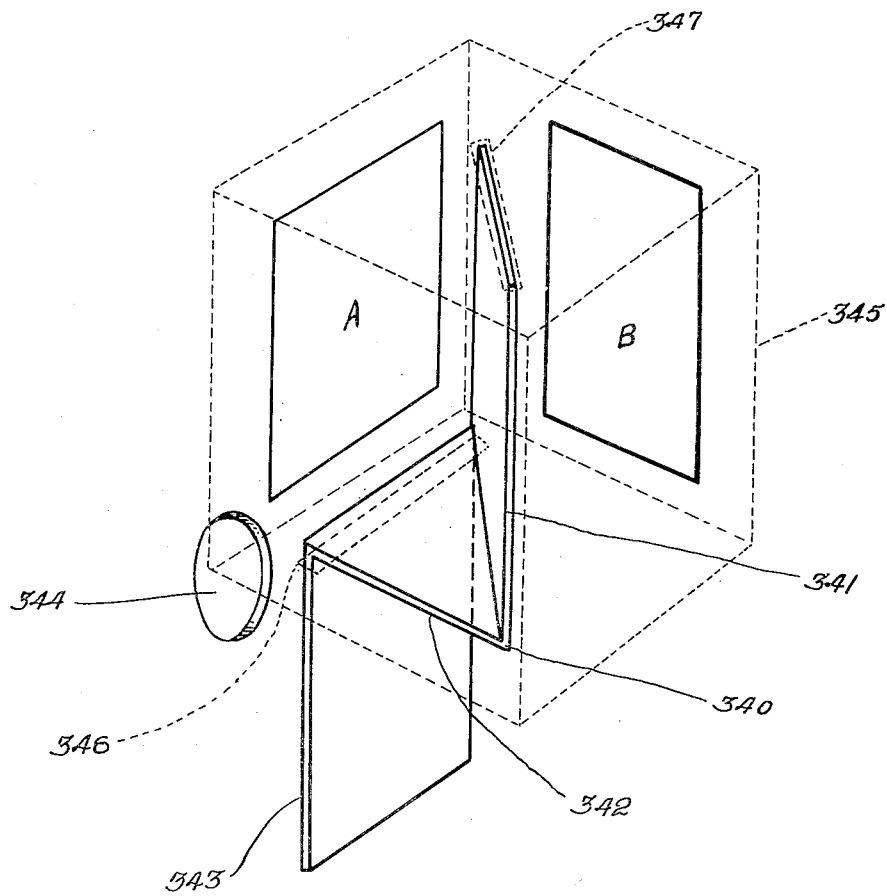

Figure 16 is a schematic diagram in perspective of an alternate embodiment of the invention.

Turning to Figure 1, the bellows casing 20 encloses the bellows and associated forward camera parts and supports the vignetter. The mirror chamber 21 is essentially a large box-like structure preferably slightly greater in height than two times the height (or greatest length) of the sensitized sheets to be used in conjunction with the camera. It is within this mirror chamber that the vertical reciprocations of the mirrors are utilized, as will be more fully explained below.

Situated above the mirror chamber 21 and the bellows casing 20 is a main mechanism casing 22 which contains the principal motivating parts of this camera. An auxiliary mechanism casing 24 extends on the right side thereof outwardly beyond the mirror chamber and within this auxiliary mechanism casing are located the driving members for operating the sensitized material magazine 23 which is also located here. On the right side of the mirror chamber there is located a focal plane chamber 25 containing the mechanism for holding the sensitized paper in position for exposure and for feeding the sensitized material into and out of said chamber.

Located within the mirror chamber and adapted for vertical reciprocation are a pair of mirrors, or mirror unit, indicated generally by numeral 26. These mirrors are preferably composed of a glass base 27 and a thin metallic coating 28 which acts as a reflecting surface. The mirrors are disposed one above the other, the upper mirror being rotated through ninety degrees with relation to the lower, and the central vertical axes of the mirrors are in alignment. The upper mirror indicated generally by numeral 29 will hereinafter be referred to as the exposing mirror, while the lower mirror 30 will be referred to as the viewing mirror. At the point of juncture between the lower edge of the upper mirror and the upper edge of the lower mirror there is a mirror separator 31 best seen in Fig. 1A of the drawings, the configuration of which is indicated by the dotted line marked 31 on Figure 3. The lower edge of the lower mirror 30 is provided with a horizontal plate 32 which is of substantially the same configuration as the mirror separator 31, and this plate best is seen in Figure 3. Mirrors 29 and 30 are each provided with backing or supporting plates 33 and 34 respectively, which are provided at the outer edge thereof with integral vertical tubes 35, 36, 37 and 38, which ride upon vertically disposed rods 39, 40, 41 and 42. The horizontal plate 32 is connected to the lower mirror supporting plate 34 by means of the right angle brackets 43 and 44 which are preferably welded to the mirror support plate 34 and riveted to the horizontal plate 32. Not seen in the drawings are a pair of brackets, similar to 43 and 44, which connect the upper portion of the lower support plate 34 to the under surface of the mirror separator 31. The right angle brackets 45 and 46 are preferably rivetted to the upper surface of the mirror separator 31 and welded to the lower rear portion of the upper mirror supporting plate 33.

The mirror chamber 21 is framed vertically by four right angle frame members 47, 48, 49 and 50. These four frame members extend upwardly from the lowest portion of the camera. The frame members 49 and 50 terminate at the level of the under surface of the floor 51 of the main mechanism casing 22, while the frame members 47 and 48 extend upwardly therethrough and terminate at the under surface of the upper cover plate 52 for the main mechanism casing. The vertical rods 39 to 42 inclusive are co-extensive with the frame members 47 to 50 respectively and these rods are supported in place by spacers at both terminals of each of the frame members 47 to 50 inclusive. Two of these spacers 53 and 54 may be seen on Figure 2.

It may now be seen that the pair of mirrors, or in other words the mirror unit, previously spoken of as being indicated by numeral 26, are combined in a unitary structure in which the two mirrors are at right angles to each other and there is a horizontal plate located between the two mirrors and another plate at the bottom of the lowest one. This mirror unit 26 is adapted for vertical reciprocation while riding on the rods 39 to 42. The vertical reciprocation of the mirror unit 26 provides for two distinct positions thereof. In the upper or normal position thereof the upper exposing mirror 29 is located within the main mechanism casing, projecting upwardly therein through a slot 55 which is sufficiently large to allow said mirror to pass upwardly therethrough. The mirror separator 31 has on the upper surface thereof buffers 31' resting against the lower surface of the floor of the main mechanism casing 22. The horizontal plate 32 is at a level just below the lower edge of the ground glass 56, as seen on Figure 1. In this position of the mirror unit 26 the upper exposing mirror is inactive, and the lower viewing mirror is in the field of light entering the camera through the lens 57 and bellows 58. This position is seen in Figure 3. The front cover plate 59 is suitably orificed at 60 to allow the light from the lens to pass through said plate. An image is reflected from the viewing mirror 30 onto the ground glass 56, or other suitable viewing screen.

In the other position of the mirror unit 26, the mirror unit is lowered so that the upper or exposing mirror 29 falls into the same horizontal position previously occupied by the lower mirror 30, and the lower mirror falls, so that the upper edge of mirror 30 is below the lower edge of the ground glass 56. In this position the mirror separator 31 lies slightly below the lower edge of the ground glass 56. The image which was previously cast upon the ground glass 56 by the mirror 30 is now cast upon the focal plane in which is situated a sheet of sensitized material 61. When the mirror unit 26 is in the exposing position thereof, just described, the only light which may enter the camera chamber and reach the sheet 61 is that which enters the camera through the lens 57. This is so because the main mechanism casing 22 is completely enclosed and no light enters the camera at this point, the supporting plate 33 is impervious to light and so, light entering the ground glass cannot penetrate the exposing mirror to reach the focal plane. The mirror separator 31 forms the bottom of the camera chamber at this time.

The two positions of the mirror unit 26 having been now clearly set forth, a synopsis of general operation will be given for purposes of clarity, and this will be followed by a more detailed description of the various mechanisms and the parts thereof.

With a sheet of sensitized material 61 located in the focal plane, and the mirror unit in its upper position, the lens is adjusted for proper focus while the operator views an inverted image of the subject on the ground glass. The manual focusing of the lens results in the movement of the lens member causing a corresponding change in the position of the vignetter and in the duration of the exposure which will be stopped when the shutter is released. When a satisfactory pose, focus and lighting has been secured, the operator connects an electric circuit by closing a switch which releases the mechanism holding the mirror unit in its upper position. The mirror unit 26 falls and as the upper or exposing mirror 29 enters into the field of light entering the camera through the lens 57, the exposure of the sensitized sheet 61 is immediately begun. This means, for example, that if the fall of the mirror unit 26 from its upper to its lower position required one second, by the time the mirror unit 26 had travelled from its upper position to its lowest position the lowermost portions of the sensitized sheet 61 would receive only a very slight exposure while the uppermost portions of sheet 61 would have received an exposure of almost one second. Actually, the rate of fall of the mirror may be controlled as will be hereinafter described to occupy considerably less time, but the example just given was for the purpose of showing that the exposure of the sensitized sheet 61 begins immediately after the upper mirror 29 enters into the field of light coming into the camera from the lens 57. This feature is of considerable advantage because no time is lost from the instant the operator decides that the post of the subject is correct. It may be noted at this point that while the mirror unit 27 is falling there is an instant in time when the mirror separator 31 is located half way down the sensitized sheet 61. In this position the mirror unit 27 has already exposed half of the sensitized sheet, while the lower portion of the image coming from lens 57 is still cast upon the ground glass. Because of the separator 31 and the horizontal plate 32, light entering the ground glass is prevented from reaching the sensitized sheet 61. In accordance with established photographic practice, all of the metal and other parts within the camera chamber proper are coated with a dead black paint so that there can be no stray reflections to spoil the image cast upon the sensitized sheet 61. When the mirror unit 26 has reached its lowest position the exposure continues. Simultaneous with the releasing of the mirror unit and at the beginning of its fall, a timing mechanism, in this instance an oil dash pot, is released, which at the completion of its cycle releases a shutter plate which falls to stop the exposure. The shutter plate is designed to fall at the same speed and in the same direction that the exposing mirror falls so that the exposure on a sensitized sheet is uniform over the entire surface thereof. When the shutter reaches its lowest position this plate closes an electric circuit which starts a motor. The interval of time existing between the original dropping of the exposing mirror and the dropping of the shutter is controlled either manually or by means of the related mechanism connected with the lens board carrying the lens. When the motor starts operating it performs several independent and related functions. It winds up a cable carrying the mirror unit and the shutter is also carried up therewith. The timing mechanism is reset to its original position. The exposed sheet of sensitized material is fed out of the camera and deposited in proper position in an automatic developing machine associated with the camera or in a suitable receptacle so that said sheet may be subsequently developed by any suitable method. Neither the receiving box nor the automatic developing machine are shown in the drawings. The motor feeds a fresh sheet of sensitized material, from a magazine containing a supply of the same, into the focal plane in position for a new exposure. The motor also actuates a brake which stops itself at the proper position for a complete cycle of actions. There is a sensitized sheet marking or identifying device in the camera which is actuated when the mirror unit 26 falls to its exposing position and this marking or identifying device is reset to its original or "off" position by the action of the motor. It may thus be seen that pictures may be taken by this camera at a frequency which is comparatively great as the total time between pictures is governed by, first, the actual duration of the exposure, and secondly, by the actual time required by the motor to rewind all of the mechanisms into their original positions. Thus, it is not necessary to have a standard timing, for if the motor requires four seconds to reset all of the mechanisms then, if the exposure is a one second exposure, five seconds only will be required in order to have everything in readiness for the next picture, while if a three second exposure picture is taken, then only seven seconds will be required to place the camera in readiness for another picture. There is no loss of time between the instant when the operator decides that the subject is in condition for being photographed and the actual initiation of the exposure. The resetting of the mirror unit is done entirely automatically and the operator may continue to view the ground glass so that as the mirror unit 26 is rewound into its upper position, the image of the subject will appear on the ground glass beginning at the bottom of the ground glass and continuing to the top.

The shutter is essentially a flat plate 62 capable of vertical reciprocation within two vertical guideways 63. These guideways have grooves on the opposed inner faces thereof within which the shutter plate slides and are affixed to the inner surface of wall 64. The shutter plate is preferably rectangular in shape and is slightly larger than the size of the sensitized sheet 61. Projecting near the lower edge of the shutter plate 62 are a pair of inwardly extending lugs 65. Lugs 65 engage a horizontally disposed trigger 66 which is adapted by means of the sliding connection at 67 for horizontal reciprocation in a forward and rearward direction (see Figure 2). The forward end of the trigger 66 is pivotally connected to one end of a long lever 68, the other end of which is adapted to be struck by a finger 106 depending from a nut 69. Nut 69 forms one element of the timing mechanism which will be subsequently described. Since lugs 65 project near the lower edge of the shutter plate 62 and the trigger 66 is located just above the level of the floor 51, when the trigger 66 is moved to the left as viewed in Figure 2, the lugs 65 are unobstructed and dropped through corresponding openings in the floor 51, thereby allowing the entire shutter plate 62 to fall to its closed position in the path of light coming from the exposing mirror 29 to the sensitized sheet 61. In its lowermost position the shutter plate 62 rests upon the mirror separator 31, so that when the mirror unit 26 is raised to its uppermost position the shutter 62 is carried along therewith. Because the lugs 65 on the left hand edges thereof are bevelled as at 70, they are able by pulling spring 66' to force the trigger 66 to the rear sufficiently to allow them to pass, thereby recocking the shutter plate 62. Projecting inwardly from the upper edge of the shutter plate 62 is a lug 71 which is adapted to strike the mercury switch assembly 72. Switch 72 is connected in circuit with the electric motor 73. Where a mercury switch is used at 72, it is important that the switch be sufficiently offset or rotated so that normal tilting of the camera itself will not make a circuit. Mercury switch 72 is normally maintained in "off" position by means of the spring 74. When the lug 71 strikes the switch 72 the circuit is made to the motor 73. However, as soon as the motor 73 begins to operate in a manner to be shown below, the shutter plate 62 together with the mirror unit 26 is raised. This results in tending to open the circuit completed through the switch 72. In order to maintain the operation of the motor 73 a lever 75 serves to keep the switch 72 in its "on" position. Lever 75 is pivotally mounted on the right end of a horizontally disposed transverse shaft 76 and said lever is provided with a follower which coacts with the cam 77. Cam 77 is adapted to maintain the switch 72 in its "on" position until the motor 73 has completed a full cycle of operation.

The mirror unit 26 is raised and lowered by means of a flexible steel cable 79 which is connected to the upper mirror support plate 33 at 78. Cable 79 passes over a roller 80 which is mounted upon a bracket 81 which is carried by a beam 82. Beam 82 is shown practically completely broken away on Figure 2 for purposes of exposing the mechanism lying therebeneath. The beam, however, is preferably of uniform width across the top of the main mechanism casing and is supported at the ends thereof by the forward and rear walls of said casing. The cable 79 is wound about a drum 83 which is of sufficient diameter so that one revolution thereof is sufficient to raise the mirror unit 26 from its lowest to its highest position. Drum 83 is mounted upon shaft 76 which is journalled in bearings 84 and 85. Affixed to the drum 83 is a plate cam 86 which is adapted to actuate a mercury switch assembly 87. Switch 87 is connected in series with the lamp 88 in the marking or identifying device described more fully below. The configuration of cam 86 is so designed that the switch 87 is allowed to be pulled into an "on" position by spring 89 when the mirror unit 26 starts its descent from its upper position and the cam 86 raises the switch to its "off" position as soon as the mirror unit 26 returned to its upper position.

The mirror unit 26 is preferably made of light material, such as aluminum castings. However, it is desirable to counterbalance this moving weight and to avoid undue shock when the mirror unit reaches its lowest position, so that the camera will not vibrate unduly, thereby giving a blurred image on the sensitized sheet 61. The counterbalancing and shock absorbing arrangement includes a cable 90 which is attached at its outer end to the upper mirror support plate 33 at 91. Cable 90 passes over a roller 92 mounted on a bracket 93 which is supported from the under surface of beam 82. The cable 90 passes through orifice 96 in wall 64 down over roller 94 which is supported by a bracket 95, best seen on Figure 4. Cable 90 descends within a split tube 97 to connect at the lower end thereof to a counterweight 98. Counterweight 98 is preferably cylindrical in shape, having a central vertical orifice, and rides upon the split tube 97. Encircling the tube 97 is a coil spring 99 which, when the mirror unit 26 drops, is adapted to absorb the shock between the weight 98 and the buffer 100 carried by a bracket 101. Bracket 101 and the buffer thereon, together with bracket 102, support the split tube 97 in vertical position. Bracket 101 is mounted on the inner surface of wall 103, while bracket 102 is mounted on the front surface of wall 104.

The timing device consists essentially of a finger 106 carried by a nut 69. The nut 69 is urged forwardly by a spring 105. In the most forward position of said finger it is adapted to strike against the lever 68 which will release the shutter plate 62 and initiate the operations of the motor 73, as has been heretofore described. The movement of the finger forwardly is prevented by an oil dash pot 107. The dash pot 107 is preferably of a type which operates at constant speed within the range of pressures encountered. The speed of the timing device is controlled by changing, through gearing and varying the leverage of a bell crank, the constant timing of the movement of the plunger 108. Two rectangular spaced parallel plates 109 are rigidly conected together by means of two spacing plates 110 and 111. Plates 109 are supported in position by uprights 112 which are affixed to and project upwardly from the floor 51. A partially threaded shaft 113 is trunnioned in plates 114 and 115. The plates 114 and 115 are affixed to the upper surface of a plate 116. Plate 116 has affixed to the under surface thereof a rack 117 which is disposed substantially along the longitudinal axis thereof, and extends forwardly to a point below plate 114. Forwardly of the termination of rack 117 and aligned therewith, plate 16 is provided with a longitudinal slot through which the finger 106 depends. Engaging the rack 117 is a pinion 118 mounted upon a shaft 119 which is journalled in two uprights 120. On the outer end of shaft 120 there is a guide plate 121, best seen in Figure 1, which carries slidably mounted within the grooves thereof a plate 122 having a rack 123 integral therewith. Plate 122 also carries pivotally mounted thereon a link 124 which is in turn pivotally connected at the forward end thereof to the rear end of the plunger 108. The guide plate 121 has an integral bracket 125 which carries trunnioned therein a pinion 126 which is integral with a shaft 127. Shaft 127 projects through wall 128 and has affixed to the outer end thereof any suitable operating knob (not shown).

A bevel gear 129 is rotatably mounted within the spacing plate 111 by means of two integral flanges which bear against the outer surfaces of said plate. The bevel gear 129 is provided on the inner surface thereof with an inwardly extending pin which engages a longitudinal slot in the shaft 113. In this manner the shaft 113 is longitudinally displaceable within the bevel gear 129, but rotary movement of bevel gear 129 will result in rotary movement of the shaft 113. Bevel gear 129 meshes another bevel gear 130 which is positioned at the top of a vertical shaft 131. Shaft 131 is journalled in a bearing 132 supported between the plates 109 and 110, penetrates floor 51 and is journalled at the lower end thereof in a bracket 133. A bevel pinion 134 is mounted upon shaft 131 and engages a bevel gear 135. Bevel gear 135 is mounted on the outside of the bellows casing 20 and is carried by a stub shaft 136 which has affixed to the inner end thereof a sprocket which is connected by means of a chain 137 to the sprocket 138. Sprocket 138 is mounted adjacent the inner surface of casing 20 upon a stub shaft 139 which penetrates said casing and has affixed to the outer terminal thereof a focusing knob 140. A link of the chain 137 is connected to the lens board 141.

It may now be seen that manipulating the knob 140 will cause the lens board 141 to move forwardly and rearwardly of the camera, carrying with it the bellows 58. By means of the mechanism just described, movement of the lens board 141 is also communicated to the bevel gear 129 so that as the lens board is moved forward the shaft 113 rotates to move the nut 69 and finger 106 rearwardly. Manipulation of the knob on the shaft 127 causes the plate 122 to move in or out of the guide plate 121 by reason of the action of the pinion 126 and the rack 123. Movement of plate 122 results in moving the pivotal connection on said plate for the link 124 toward or away from the center of rotation of said plate, it being understood that the entire assembly, including shaft 127, plate 122, guide plate 121 and shaft 119, rotates as a unit. Assuming the plunger 108 to move into the dash pot 107 at a constant rate of speed within the range of pressures encountered herein, it may thus be seen that the rotation of shafts 127 and 119 will be more rapid when the rear pivotal connection of link 124 is nearer the axis of shaft 119, and conversely, the speed of rotation of shaft 119 will be slower when the rear pivotal connection of link 124 is away from the axis of shaft 119. Since the plate 116 and the plates 114 and 115 are an integral unit, the timing device is cocked by means of a plate cam 142 which bears against a follower 43 which is integral with the plate 116. Cam 142 is mounted upon the left end of a shaft 144 which, when driven by the motor as will be described below, revolves in a direction indicated by the arrow thereat. Cam 142 thus forces the plate 116 rearwardly against the action of the spring 105. When the plate 116 is in its rearmost position it is maintained in the cocked position by a lever 145 which is adapted to snap in front of the follower 143 by reason of the action of the contractile spring 146. The levers 145 and 68 are pivotally mounted off the floor 51 on a short upright, not shown. The inner end of lever 145 is provided with a follower adapted to co-operate with the plate cam 147 which is mounted upon the shaft 76. The cam 147 is of such configuration that the rise thereof strikes the follower of the lever 145 when the shaft 76 begins to make a revolution in a clockwise direction, as indicated on Figure 2 by the arrow 148, at which time the mirror unit 26 is just below its highest position. Although there is no pressure upon the follower of lever 145 at the time the cam 142 recocks the timing mechanism, the angular arrangement of the outer end of lever 145 is such that the follower 143 may slide thereagainst and push it out of the way until the follower 143 has reached its rearmost position, at which time the outer end of lever 145 is pulled in front of follower 143 by spring 146, as described. It may now be seen that moving the nut 69 with the finger 106 thereon rearwardly of the device because it enlarges the distance through which the finger 106 must travel before it strikes the lever 68, will result in increasing the time of the exposure. The movement of nut 69 is controlled by the movement of the lens board, as has heretofore been described. Forward movement of the lens board for close-up requiring greater time will cause the nut 69 to move rearwardly. Where the operator desires to make changes in the length of exposure for other reasons, or to alter the automatic regulation just described, turning the knob on shaft 127 will move the rear pivotal connection of link 124 closer to or further away from the axis of shaft 119 and such movement away from the axis will increase the distance through which the rear pivotal connection of link 124 must travel as the plunger 108 is forced into the dash pot. Since the pivotal connection of link 124 must travel through a greater distance when it is away from the axis of shaft 119 by reason of the leverage effect, the shaft 119 will rotate more slowly and hence the pinion 118 will rotate more slowly. The reduced speed of pinion 118 will reduce the speed of travel of the rack 117 and consequently the plate 116, so that the finger 106 will move more slowly toward the lever 68.

The dropping of the mirror unit 26 as has been described initiates the exposure and the mirror unit is released from its uppermost position by the following mechanism:

A cam 149 is mounted upon the shaft 76. This cam is of a configuration having a lug extending over the end of the plunger 150. The plunger 150 is maintained in contact with the cam 149 by the spring 151. When the solenoid 152 is energized, preferably by means of an electric cable having a push button switch on the end thereof, the same not being shown in the drawing, the plunger 150 which acts as a link connection to the armature of said solenoid is pulled out of the way of the cam 149 which, being thus freed, allows the shaft 76 to turn, as indicated by arrow 148. In order to provide an absolute stop for the lowermost position of the mirror unit 26, there is provided a stop 153 which co-operates with a cam 154. Cam 154 is provided with a projection which, when the shaft 76 has made the desired amount of revolution in the direction indicated by arrow 148, strikes against the stop 153 limiting further motion. In this connection, also note the action of buffers 31' and 100.

When the motor 73 has been energized by switch 72, the motor 73 begins to revolve, preferably at a speed of 6500 R. P. M. and, by means of the coupling 155, turns the shaft 156. Shaft 156 communicates with a gear reduction box enclosed between vertical plates 157 and 158. These plates are connected together by means of a plurality of spacer supports 159, while the plate 158 is supported off the wall 103 by brackets not shown in the drawings. The shaft 156 is suitably journalled and carries thereon a worm 160 which meshes with a gear 161. Gear 161 is mounted on a shaft 162 which is trunnioned between the plates 157 and 158. Shaft 162 rotates in a direction indicated by the arrow thereat at a speed of preferably 45 R. P. M. Mounted on shaft 162 is a pinion which meshes with a large gear 163 mounted on shaft 164 which is journalled at one end thereof in plate 158 and at another point in the bearing 165. Shaft 164 rotates preferably at a speed of 15 R. P. M. The inner end of shaft 164 carries a bevel gear which meshes with a bevel gear 166 mounted upon shaft 144. Shaft 144 carries the plate cam 142 associated with the timing device and also the cam 77 referred to above, which acts to continue the source of supply of electrical energy to the motor 73 after the switch 72 has ceased to be actuated by the lug 71. There is preferably no gear ratio change between bevel gear 166 and its companion mounted on shaft 164, and so the cam 77 makes a full revolution in approximately four seconds, at which time the low point on the cam plate coincides with the follower of the lever 75 and the motor stops to be re-energized when the lug 71 strikes the switch 72.

In order that the entire mechanism may stop exactly when a complete cycle has been performed thereby, a braking mechanism is provided including a disc 167 carrying affixed thereto a correspondingly shaped disc of suitable fabric or other frictional material, a non-rotating braking disc 168, which is actuated by a bifurcated lever pivotally connected thereto and integral with a transverse shaft 169. Shaft 169 is trunnioned between plates 157 and 158 and carries thereon a radial lever 170, the follower of which is moved by a plate cam 171, fixedly mounted on shaft 164. The rise or high point on cam 171 is adapted to actuate the braking mechanism just prior to the completion of the motor cycle, so that by the time the motor comes to a full stop the lever 170 will no longer engage the said high point on cam 171. This is desirable so that when the switch 72 is closed the motor will not have to buck against the brake as it starts.

Shaft 144 has affixed thereto a mutilated gear 172 which meshes with a pinion 173. The mutilated gear 172 as driven by shaft 144 serves to drive the pinion 173 and thereby to rotate the shaft 76 in the direction indicated by the arrow 174 which elevates, through mechanism previously described, the mirror unit to its upper position. The gear 172 is mutilated so that there may remain a blank space on the periphery thereof which will be adjacent the pinion 173 at the time the mirror unit 26 descends. In this manner the rotation of the shaft 76 is not inhibited by any connection between the pinion 173 and the mutilated gear 172.

In order that each print issued by the camera may be properly identified, the camera is provided with an identifying device 175 which has been generally referred to hereinabove. This device 175 includes a casing 176 the shape of which may be determined by a reference to Figures 1 and 2. The casing 176 contains a suitable source of illumination such as an incandescent lamp 88. A small card 177 carries the desired identifying information on the undersurface thereof. Card 177 has for example printed thereon the name of the studio, the date, the name of the subject and any desired numerals. In use the card is inserted, face down and left hand end foremost, through a slot in the upper rear wall 178, and through a correspondingly located slot in casing 176 into a pair of grooved guideways (not shown) affixed to the under surface of the top wall 179 of casing 176. Suitably supported in a horizontal partition 180 within casing 176 is a lens 181 adapted to cast an image of the material on card 177 onto a mirror 182 which reflects said image through a rectangular orifice 183 in the plate 33 (see Figure 1A). The said image passes through the glass base 27 of the upper mirror 29 (in its lower position) to the upper right hand corner of the sensitized sheet 61, as viewed from the left side of the camera. Since the picture or image from lens 57 is inverted on said sheet, the written matter of card 177 will appear right side up on the lower left hand corner of the finished picture on a sheet 61. In order that the image of the card 177 may have an unobstructed path the metallic coating 28 is removed from the glass base 27 for an area corresponding to the orifice 183.

As has been stated above the lamp 88 is illuminated by closing of switch 87 which is controlled by the cam 86. Since the duration of the period during which lamp 88 is illuminated is controlled by the length of the photographic exposure of the image from the lens 57 on the sheet 61, the image from lens 181 is exposed for a uniform period on sheet 61 in the following manner. The shutter plate 62 is provided with an extension 184 and with an indentation 185. The extension 184 when plate 62 is in the upper position thereof lies in the path of the image from the mirror 182. When the shutter plate 62 drops, however, to its lower position, the indentation 185 takes the position formerly occupied by the extension 184 thereby allowing the image from mirror 182 to actinically affect the sheet 61. When the shutter plate 62 is in its uppermost and lowermost positions, the lower edge 186 thereof rests on the upper surface of plate 31, but the projection 184 projects downwardly through a suitable opening in plate 31, which is illustrated in Figure 1A in which the outline of the shutter plate 62 is shown in dot dash lines. In Figure 1A the dot dash line indicating the lower edge 186 has been dropped slightly for purposes of clarity.

As soon as the shutter plate 62 strikes the plate 31, it also starts the motor 73 by closing the switch 72, which results in the elevation of the shutter plate 62. Hence the exposure of the image from mirror 182 on sheet 61 is comparatively short in duration, but it is uniform and the intensity of the illumination supplied by the lamp 88 is sufficient for adequate exposure of said image.

The supply of sensitized sheets is kept within a magazine 23, illustrated in Figures 9 to 12 inclusive, which includes a box-like casing 187 and a pair of movable retaining plates 188. The casing 187 comprises a rear wall 189, a top wall 190, a bottom wall 191 and side walls 192 and 193. Affixed to the side walls 192 and 193 adjacent the front edges thereof are a pair of angle strips 194 and 195 which have indentations 196 and 197 respectively. The retaining plates 188 have similar indentations 198 and are slidably secured to the angle strips 194 and 195 by means of the headed studs 199. The retaining plates 188 have horizontally disposed slots 200 which are countersunk so that the tops of studs 199 are flush with the outer surface of the plates 188. The length of the slots 200 is sufficient to permit the plates 188 to be laterally displaced so that a stack 201 of sheets 61 may be readily inserted therein.

Joining the top wall 190 to the side walls 192 and 193 are angle strips 202 and 203. The bottom wall 191 is joined to said side walls by angle strips 204 and 205. The stack 201 of sheets 61 of sensitized material is supported at the bottom of the stack by guides 206. These guides have level upper surfaces and extend from the rear wall 189 forwardly to terminate in connection with the upper edge of a guide 206' arranged at right angles thereto and extending across the front of the bottom wall 191. Guides 207 similar to the guides 206 are provided on the side walls 192 and 193. Affixed to the wall 192 is a large guide plate 208 while on the opposite wall 193 there is located a resilient guide plate 209. Plate 209 is resiliently mounted off wall 193 by means of screws 210 which have the terminals thereof fixedly seated in the plate 209 and have encircling the shanks thereof, expansive springs 211.

The plate 209 pushes the stack 201 toward the plate 208 so that the sheets are properly laterally aligned while the action of gravity upon the stack 201 properly aligns the sheets 61 against the guides 206 and 206'. A pusher plate 212 is provided for advancing the stack 201 forwardly within the magazine 23. Plate 212 is preferably shaped as best seen in Figure 11, the guides 207 serving in conjunction with the guides 206 and 206' to maintain it in proper position as it is urged forward within the magazine by the action of the pivotally mounted U shaped arms 213. The arms 213 are identical in construction and are trunnioned in supporting brackets 214 which are fastened to reinforcing strips 215. The spiral springs 216 are adapted to urge the arms 213 in an arcuate direction rearwardly as indicated by the arrows on Figure 12. The forward edge of the top wall 190 is cut away as indicated at 217 in Figure 12 for a depth corresponding to the thickness of one of the sheets 61 to permit the insertion at that point behind the retaining plates 188 of a light-proof slide (not shown) in order to protect the stack 201 from exposure while the magazine is being transported from a dark room, where it has been loaded, to the camera. After the magazine is in place on the camera, the light-proof slide is of course removed, at which time the cut away portion 217 performs another function as will be hereinbelow described. The bottom wall 191, together with the guide 206', is provided with a similar cut away portion indicated at numeral 218 on Figure 12 and the cut away portion just referred to is further indented at the ends thereof as indicated by numerals 219 on Figure 9.

After the magazine 23 has been loaded with a stack 201 as has been previously described, the retaining plates 188 are moved toward each other to occupy the position indicated by the full lines on Figure 9. The front of the magazine is then placed facing the camera as shown in Figure 4 and the outer edges of the retaining plates 188 and the angle plates 194 and 195 are inserted behind the magazine retaining lugs 220. Lugs 220 are L shaped as viewed from the front of the camera with the horizontal portion of the L projecting inwardly. The lugs 220 are affixed to angle plates 221 which in turn are attached to the wall 64. In this position the retaining plates 188 are prevented from laterally shifting away from each other. The front surfaces of retaining plates 188 (now the inner surfaces thereof with relation to the camera as a unit) rest against the outer surfaces of a pair of oppositely disposed grooved guides 222. The grooved guides 222 are mounted on the angle plates 221 and wall 64 so that they are spaced from the said wall by spacers 233 (see Figure 2). Situated between the two oppositely disposed grooved guides 222 is a magazine feeder plate 223. Magazine feeder plate 223 is essentially a flat plate having a feeder bar 224 affixed to the outer surface along the upper edge thereof. Two pressure bars 225 are affixed to the outer surface of plate 223 adjacent the vertical longitudinal edges thereof. One surface on each of the pressure bars 225 is adapted to slide along the inner edge of each of the grooved guides 222. The bottom edge of plate 223 is cut away as indicated at numeral 226. Disposed below the plate 223 and affixed to the wall 64 is a horizontally disposed roller 227 suitably trunnioned on brackets projecting from wall 64 and adapted to turn freely. A roller 228 similar in size and construction to the roller 227 is affixed to the outer face of plate 223 just below the feeder bar 224. Projecting inwardly of the camera from the inner face of plate 223 is a stud 229 which engages a slot in one end of a lever 230. Lever 230 is disposed between the wall 64 and the plate 223 and is pivotally mounted on a pin 231 projecting outwardly from the wall 64. The angle plate 221 is cut away adjacent the pin 231 to allow the lever 230 to pass therethrough and have the acquired freedom of movement. The lever 230 is provided with a follower which coacts with a cam 232 mounted on shaft 144. The forward end of lever 230 is provided with a contractile coil spring 234 which is connected at the upper end thereof to the bracket 95.

It may now be seen that the rotation of the shaft 144 causes a rotation of the cam 232, thereby imparting by means of the lever 230 a vertical reciprocation of the feeder plate 223. The rollers 228 and 227 are adapted, by reason of their position, to bear against the innermost sheet 61 (innermost with relation to the camera), and also the pressure bars 225 are adapted to press against the sensitized surface of the sheet 61 adjacent the outer vertical edges thereof. The feeder bar 224 projects outwardly of the roller 228 and the pressure bars 225, an amount equal to the thickness of a single sheet 61. Thus, when the feeder bar 224 engages the upper edge of the innermost sheet of the stack 201, it is adapted to pull said sheet downwardly until the lower edge of said sheet may be engaged by the roller 235 therebeneath. The roller 227 maintains the sheet being fed in proper position and the said roller 227 is fixed with relation to the moving plate 223 so that the cut away portion 226 clears roller 227 when the plate 223 is in its lowermost position. Under the pressure of the feeder bar 224 and the pressure bars 225 the innermost sheet 61 of the stack 201 is liable to buckle slightly outwardly of the camera and it is for this reason that the cut away portions 219 hereinbefore described have been provided, so that the passage of said sheet from the magazine 23 will be uninhibited. The feeder bar 224 is adapted to engage the innermost sheet of the stack 201 by reason of the fact that plate 224 enters the magazine 23 and rides within the cut away portion of the top wall 190 as hereinbefore referred to in connection with numeral 217. The placing of the magazine into the camera and hooking same within the lugs 220 is facilitated by the bevelling 236 at the edges of the angle strips 194 so that the magazine may be placed in or removed from the camera merely by moving it slightly vertically and then drawing the magazine away. Of course, it is understood that the outside cover plate of the camera at that point must be removed or preferably a hinged closure may be provided for this purpose, the same, however, not being shown in the drawings.

The roller 235 is suitably trunnioned in a pair of bearings 237 and has a driven roller facing the innermost tangential surface thereof, said driven roller not being shown in the drawings. The driven roller just referred to is trunnioned in the bearings 237 and is geared to roller 235 by means of the gear 235' and exerts sufficient pressure with relation to roller 235 so that a sheet 61 may be positively fed therebetween downwardly into the focal plane. Disposed below the roller 235 and spaced from and mounted upon the wall 64 are two pair of oppositely disposed grooved guides 238 and 238' between the grooves of which the sheet 61 is adapted to be maintained in flat condition and in the focal plane of the camera proper. The upper ends of the guides 238 are adjacent the meeting point of the roller 235 and its companion roller, so that as the sheet is fed between the two rollers downwardly it enters the grooves of said guides. Suitably journalled off the wall 64 is a feeding spool 239 having identical flanges 240 which coact with a pair of rollers 240' also journalled off the wall 64. The configuration of these flanges 240 is best seen in Figure 4A of the accompanying drawings. Each of the flanges is provided with a feeding elevation 241 and a discharging elevation 242. The lower ends of the guides 238, adjacent the flanges 240, are cut away to allow said flanges to act upon a sheet 61 situated within grooved guides 238 and 238'. When a sheet 61 has passed through the roller 235 and has ceased to be contacted by said roller, the sheet is still elevated with relation to the camera so that the sheet does not fall exactly within the focal plane. The flanges 240 rotate and the elevation 241 engages the sheet 61 and moves it downwardly a sufficient amount so that said sheet lies squarely within the focal plane and opposite the opening in wall 64 through which the image from the lens 57 passes. Disposed at the lower ends of the guides 238 is a pair of rollers 243 and 244. Roller 243 is similar in construction to roller 235 and is trunnioned in bearings 245 suitably mounted off the wall 64. Roller 243 has a co-operating driven roller similarly to the roller 235. After the exposure has been made on the sheet 61, the flanges 240 rotate and the discharging elevation 242 contacts the sheet 61 forcing same downwardly within the guides 238 so that the lower edge of sheet 61 engages the meeting point of the roller 243 and its companion, which last mentioned rollers rotate to feed the sheet into the mechanism for discharging the exposed sheet onto the conveying belt of an automatic developing machine, or as has been described otherwise hereinabove.

The roller 243 and the roller 235 operate at the same speed of 45 R. P. M. and are connected together by the sprocket chain 246. Chain 246 engages a sprocket 247 integrally connected to the forward end of the roller 243, and a sprocket 248 integrally connected to an extension off the forward end of roller 235. The forward end of the said extension is provided with a sprocket 249 which is connected by means of a chain 250 to a sprocket 251. Sprocket 251 is mounted on a stud shaft 252 which is journalled in the arms of a U shaped bracket affixed to the wall 64 and best seen in Figures 2 and 4. The rear end of shaft 252 projects through the rear arm of the U shaped bracket and has affixed thereto a sprocket 253 which is connected by means of a chain 254 to a sprocket 255 mounted on the rear end of the shaft 162 described above.

The feeding spool 239 derives motion in the following manner. The feeding spool 239 is provided with an axial extension having thereon a large sprocket 256 which is connected by means of a chain to a small sprocket 257 which is affixed to a rearward axial extension of the roller 235. This structure is seen in the lower left hand corner of Figure 2. The relative sizes of the sprockets 256 and 257 are adjusted to give a rotation of the feeding spool at the rate of 15 R. P. M. Sprocket 257 of course derives its rotation through the roller 235 and the mechanism for driving said roller, as has been previously described.

In the present specification and drawings, there are included two alternate embodiments of the mechanism for discharging the exposed sheet onto a conveying belt or as has been described above. Turning to the embodiment illustrated in Figure 4, two movable shelves 258 and 259 are seen. The upper shelf 258 is provided with a pair of oppositely disposed supporting sides 260 which at the upper ends thereof are pivotally affixed to brackets 245 (see Figure 3). The shelf 258 is connected by means of a long link 261 to the rear end of a long lever 262. Adequate articulation is provided for the connection just described by means of universal joints 263. The lever 262 is pivotally mounted on a bracket 264 supported by the wall 104. The forward end of lever 262 is provided with a follower which coacts with the cam 265. A contractile spring 266 connects the forward end of lever 262 with the bracket 95 and said spring serves to maintain said lever in proper operating position with relation to said cam. The lower shelf 259 is pivotally mounted adjacent the rear edge thereof by means of an integral shaft 267 which is suitably trunnioned in a pair of bearing blocks 268 mounted upon brackets 269 which are affixed to the inner surface of the wall 283 adjacent the lower edge thereof. The lower shelf 259 is provided with an integral extension 270 which is pivotally connected by means of a long link 271 to the rear end of a lever 272. Lever 272 is pivotally mounted on the bracket 264 similarly to the lever 262 and is provided at the forward end thereof with a follower adapted to coact with the cam 273. Cam 273 and cam 265 are mounted on the right hand end of the shaft 144. This structure is best seen in Figure 2. The cams 273 and 265 are so shaped that together with the lever actions just described the following operation takes place in the upper and lower shelves 258 and 259 respectively. At the beginning of a cycle of sheet feeding from the focal plane as has heretofore been described, the shelf 258 is disposed at an angle of substantially forty-five degrees as viewed from the front or rear of the camera. The lower shelf 259 at the beginning of said cycle takes the position shown by the full lines on Figure 4. As the cycle continues, the lower shelf rises to a position indicated by the dot dash lines on said figure and at that time the upper shelf 258 has dropped to a vertical position. As the cycle continues, the upper shelf moves to an angle of forty-five degrees from the vertical as viewed from the front or back of the camera, said new angle of forty-five degrees being ninety degrees rotated from the original position of said upper shelf 258. During the last portion of the cycle the upper shelf 258 returns to its original position and the lower shelf 259 also drops to its original position. The result of these actions is as follows: A sensitized sheet, having been ejected from roller 243, is deposited upon the upper shelf 258 with the sensitized surface thereof facing said shelf. The sheet glances or slides off the upper shelf 258 and the bottom edge of said sheet strikes the right hand side of two sides 274 of the shelf 259 which is at that instant in its horizontal position, or as indicated by the dot dash lines on Figure 4. The shelf 259 remains for a period in the said horizontal position and the upper shelf continues its rotation as has been heretofore described, so that the upper edge of the sheet is allowed to pass and fall out of contact with the upper shelf 258. The sheet thus freed falls face down upon the lower shelf 259. At this operation of the cycle the lower shelf 259 suddenly drops, thereby allowing the sheet thereon to fall upon a conveying belt in an automatic developing machine or into a suitable receptacle.

Turning now to Figures 5, 6, 7 and 8, there is shown an alternate type of mechanism for performing what has just been described. In this mechanism only one movable shelf 275 is used. Shelf 275 is provided with a pair of opposed upwardly extending sides 276 and 277 and is mounted upon a squared shaft 278. Shaft 278 is pivotally mounted at 279 in another squared shaft 280. Squared shaft 280 is trunnioned at the ends thereof in a pair of brackets 281 which are affixed to a pair of vertically disposed angle strips 282 which are in turn attached to the wall 104 and lower rear wall 283. The rear end of shaft 280 is provided with a radial extension arm 284 which is pivotally connected by means of a long link 261' to the rear end of a lever 262'. An articulation is provided for by means of the universal joint 263'. Lever 262' is pivotally mounted on the bracket 264' and the forward end thereof is provided with a follower which coacts with a cam 265'. A contractile spring 266' is adapted to cause the lever 262' to follow the cam 265'. The shelf 275 is adapted to be maintained in its normal horizontal position by means of a contractile spring 285 which pulls the rear portion of the shelf 275 downwardly so that it strikes a stop 286 affixed to the squared shaft 280, as best seen in Figure 6. A projection 287 extends downwardly and forwardly from the lower rear wall 283 and is adapted to strike against the rear portion of the shelf 275 whenever same is dropped below a horizontal position. The normal position of the shelf 275 at the beginning of a cycle is seen in Figure 5, in which the shelf 275 is disposed at an angle substantially indicated by the dot dash line in Figure 7. In this position a sheet, after having been discharged by the roller 243, will fall upon the shelf 275 face down and with the lower edge thereof resting against the side 276. The shelf 275 is then lowered by means of the action of the lever 262' and related mechanism, as has heretofore been described, until the shelf takes a position substantially horizontal, as indicated in Figures 7 and 8. The shelf 275 is then caused to further drop so that the rear portion thereof strikes the projection 287 causing the shelf to tilt about an axis extending through the pivotal connection 279, so that said shelf will take a position indicated by the dot dash lines in Figure 8. In this position, a sheet on the shelf 275 will be jarred loose therefrom and will fall by the action of gravity and inertia onto a conveyer belt of an automatic developing machine or into another container. After the sheet has been discharged, the shelf 275 is returned to its normal position in readiness to begin another cycle.

The camera is provided with a vignetting device, the structure of which will now be described. This vignetting device is essentially composed of an L shaped arm 288 which acts as a lever and as a frame upon which the other parts of the vignetter are mounted. The arm 288 has affixed adjacent the outer forward end thereof an angle arm 289, the configuration of which is best seen in Figure 13. Trunnioned between the forward ends of arms 288 and 289 is a substantially U shaped member 290 which is comprised of a flat plate 291 and two bearings 292 affixed thereto. Plate 291 has pivotally affixed thereto a rotatable plate 293 which has at the outer ends thereof a pair of oppositely disposed grooved guides 294 within which a vignetting plate 295 is adapted to be removably placed. The plate 293 is provided with a boss 296 which extends through a bearing in the plate 291 to have affixed to the rear end thereof a pinion 297 which meshes with a worm 298 mounted on a transversely disposed shaft 299. Shaft 299 is journalled in the forward end of the arm 288 and the angle arm 289 and is prevented from longitudinal displacement (relative to said shaft) by a collar 300 and a bevel pinion 301 which are attached to the shaft 299 by means of set screws. The bevel pinion 301 meshes with a companion bevel pinion 302 affixed to the forward end of a shaft 303. Shaft 303 is journalled in bearings 304 and 305 affixed to the inner side of the arm 288 and penetrates at 306 a suitable orifice in the arm 289. The rear terminal of shaft 303 is provided with a bevel pinion 307 which meshes with a bevel pinion 308 on the inner end of a short shaft 309. Shaft 309 is rotatably disposed within a cylinder 310 provided with an integral flange 311 on the inner end thereof and a removable flange 312 which is suitably keyed to the outside of the cylinder 310, said keying not being shown in the drawing. The outer end of shaft 309 is provided with an operating knob 313, Fig. 1. It may now be seen that rotation of the knob 313 will be communicated by means of the structure just described to the pinion 297, resulting in the rotation of the plate 293 together with the vignetting plate 295 about a substantially horizontal axis, said axis running from the front to the rear of the camera.

The U shaped member 290 is provided at one end thereof with an L shaped bracket 314 which is pivotally connected to a link 315, the rear end of which is shaped as shown in Figure 15 and is pivotally connected to a disk 316. The disk 316 is integrally connected to a shaft 317 which is rotatably mounted in the arm 288. Shaft 317 at the outer end thereof is provided with an operating knob 318 and at the inner end thereof with a peripherally notched disk 319. A short lever 320 is pivotally mounted at the end thereof on the arm 288 and the upper end thereof is pulled forward by means of a spring 321. The projection 322 on the lever 320 is adapted to engage the notches in the disk 319 to retain any adjusted position of the link 315 and consequently the U shaped member 290. Rotation of the knob 318 will result in the plate 293 and the vignetting plate 295 rotating about an axis substantially horizontal and disposed transversely of the camera, thereby bringing the upper edge 323 of the vignetting plate 295 toward or away from the lens 57.

The cylinder 310 is mounted in an orifice in the left side wall 324 of the bellows casing 20 and hence the arm 288 is pivotally mounted in said cylinder 310 which is relatively fixed. The upper end of the arm 288 is provided with a follower 325 which coacts with a cam 326 (see Figure 4). Cam 326 is mounted upon a shaft 327 which is rotatable in wall 324. The outer end of shaft 327 is provided with an operating knob 328. Shaft 327 between knob 328 and wall 324 is provided with a peripherally notched disk 329. A lever 330 is pivotally mounted at the lower end thereof at the outside of the wall 324 and is urged forwardly by the action of a spring 331. A projection on the forward edge of lever 330 coacts with the peripherally notched disk 329 to hold same in any adjusted position thereof. It may now be seen that rotation of the knob 328 will result by the action of cam 326 in raising or lowering the vignetting plate 295 which is mounted on the forward end of arm 288, as has heretofore been described. A large gear 332 is rotatably mounted on the shaft 327 and is free to rotate thereabout. The gear 332 meshes with a pinion, not seen in the drawings, said pinion being fixedly mounted on the shaft 139 between the sprocket 138 and the wall 324. The gear 332 is provided with an arcuately shaped slot 333 which engages a pin 334 integral with cam 325 and projecting outwardly therefrom. It may thus be seen that regardless of any adjusted position of the cam 326 caused by manipulation of the knob 328 after a predetermined amount of movement of the lens board 141, the play existing between the pin 334 and the slot 333 will be taken up and further rotation of the shaft 139 will result in a change in the position of the cam 326 and consequently the arm 288. The configuration of cam 326 is designed to cause the vignetting plate 295 to be raised when the lens board 141 is moved forwardly in order to take a bust picture, and conversely, to cause the vignetting plate 295 to drop downwardly out of the way when the lens board 141 is moved rearwardly for the purpose of taking a full figure or group. Thus, movements of the lens board result in movements of the vignetting plate, yet, because of the play existing between the pin 334 and the slot 333, the operator by manipulating the knob 328 may make vernier adjustments of the position of the vignetting plate 295.

Turning now to Figure 16, there is shown a schematic view of an alternate embodiment of the invention. This view appears in perspective as seen from an elevated point off the upper forward left corner of the camera.

The mirror unit 340 is composed of a mirror 341, a separator 342, and a plate 343. The mirror is angularly disposed with relation to the surface A and is adapted to reflect onto said surface an image cast upon the mirror by the lens 344 (bellows not shown), when said mirror is within the camera casing or chamber 345. The plate 343 as shown is disposed outside of the chamber 345, projecting through a light proof slot 346. When the mirror unit 340 is moved upwardly in the plane of the mirror, by any suitable structure such as that illustrated in connection with the principal embodiment of the invention, the mirror 341 passes out of the chamber 345 through a light proof slot 347 and the plate 343 rises to cover the surface A in light proof fashion so that the image cast by lens 344 will fall on the surface B. The separator 342 performs functions similar to the separator 31 in isolating the different light beams within the camera chamber 345.

The alternate embodiment in Figure 16 is operable in two principal ways. First, if sensitized material is placed on surface A, the camera is loaded with such sensitized material while the mirror unit 340 is in its upper position. The image is focussed upon the viewing screen placed on surface B. Then, when the mirror unit drops, the exposure by reflection of mirror 341 is initiated on the surface A. To stop the exposure, a shutter plate like shutter plate 26 may be utilized as has heretofore been described, or where the exposure of the sensitized material is of long duration and the movement of the mirror unit is relatively rapid, the mirror unit may be elevated to its original "up" position to stop the exposure of the surface A.

Second, if sensitized material is placed on surface B, the camera is loaded with such sensitized material while the mirror unit is in its "down" position. The image is focussed upon the viewing screen placed on surface A by reflection from the mirror 341. Then when the mirror unit rises, the exposure of the image cast by the lens 344 is initiated on the surface B. To stop the exposure, a shutter plate, similar to plate 26 may be utilized, as described in the paragraph directly above, or the mirror unit may be lowered to its original "down" position.

It is to be understood that both with regard to the principal embodiment and the alternate embodiments, that the mirror units 26 and 340 have the vertical edges thereof in cooperative relation with the adjacent camera casing or chamber portions so that a light tight arrangement results. Also that the separator 31 and the plate 32 conform substantially to the camera chamber or casing so that they fit in light tight relationship. The separator 342 has the front edge and the edge facing the surface A in a sliding light tight relationship with the camera casing or chamber. The slots 55, 346, and 347 have suitable means associated therewith such as velvet or plush or spring mounted flaps (not shown) to assure a light tight connection at these points regardless of the movements of the mirror units 26 and 340.

The speed of movement of the mirror units is determined by the counterbalancing weights and shock absorbing springs, and though shown as being gravity acting, these mirror units may be power driven where desired.

In all the embodiments illustrated it is necessary that the distances from the lenses to the mirrors be so adjusted that an image in clear focus on the ground glass will be in the same clear focus on the focal plane or surface carrying the sensitized sheet.

The foregoing description has been made rather detailed for clearness of understanding only, and no unnecessary limitations should be understood therefrom, but the appended claims should be construed as broadly as permissible in view of the prior art.

I claim:

1. In a camera assembly: a camera chamber; a lens having an optical axis projecting into said chamber and thereby adapted to cast a stationary picture image into said chamber; a focal surface having sensitized photographic material thereon, said focal surface being positioned with respect to said chamber that an imaginary first perpendicular erected from said surface into the chamber will form a first angle with relation to said axis; a stationary viewing screen, positioned with respect to said chamber that an imaginary second perpendicular erected from a surface of said screen into the camera chamber will form a second angle with relation to said axis; a plane exposing reflector movable in its own plane, said plane being disposed with relation to said axis and said first perpendicular that a third perpendicular erected from the active surface of the exposing reflector will substantially bisect the first angle; the extent of the movement of the exposing reflector being such that in one position thereof the exposing reflector may reflect onto the sensitized material on the focal surface a stationary image cast upon the reflector by the lens, and in another position thereof to lie outside of the field of the image cast by the lens; said exposing reflector while moving from either of said positions to the other position casting a reflection of said stationary image onto the said sensitized material on the focal surface, the area of the image reflected on said sensitized material being in proportion to the amount of the active surface of the exposing reflector in the path of the image from said lens; a plane viewing reflector movable in its own plane, said plane being disposed with relation to said axis and said second perpendicular that a fourth perpendicular erected from the actice surface of the viewing reflector will substantially bisect said second angle; the extent of movement of the viewing reflector being such that in one position thereof the viewing reflector may reflect onto the viewing screen a stationary image cast upon the viewing reflector by the lens, and in another position thereof may lie outside of the field of the image cast by the lens; said viewing reflector while moving from either of said positions to the other position, casting a stationary reflection of said stationary image onto the said viewing screen, the area of the image reflected on said screen being in proportion to the amount of the active surface of the viewing reflector in the path of the image cast by said lens; said exposing and viewing reflector being associated with each other to be mutually displaceable in the camera chamber and thereby having the ability in moving into the camera chamber of reflecting to either the sensitized material or the viewing screen respectively, without any movement or blurring of said image, the proportionate area of said image cast upon either of the reflectors.

2. In a camera assembly: a camera chamber; a lens having an optical axis projecting into said assembly; a focal surface having sensitized material thereon, said focal surface being positioned with respect to said chamber that an imaginary first perpendicular erected from said surface into the chamber will form a first angle with relation to said axis; a plane reflector movable in its own plane, said plane being positioned with relation to said axis and said first perpendicular that a second perpendicular erected from the active surface of said reflector will substantially bisect said angle; the extent of the movement of the plane reflector being such that in one position thereof the reflector may reflect onto the sensitized material on the focal surface a stationary image cast upon the reflector by the lens, and in another position thereof to lie outside the field of the image cast by the lens; said reflector when moving into the picture image field cast by the lens serving to directly initiate a photographic exposure of the sensitized material; shutter means to protect the sensitized material from all light entering the camera chamber; timing means whose action is commenced in synchronism with the inception of the movement of the reflector initiating the exposure of the sensitized sheet; said timing means controlling the interval between the inception of the movement of the reflector into the exposing position thereof and the actuation of the shutter means stopping the exposure.

3. In a camera assembly: a camera chamber, a lens adapted to cast an image within said chamber; a focal surface adapted to carry a sensitized sheet thereon; shutter controlling means; a settable shutter; power means; a power source; a movable reflector movable in its own plane, said plane being disposed with relation to said chamber that a perpendicular erected from it will bisect an angle formed by two perpendiculars erected from the lens and focal surface respectively into the camera chamber, whereby said reflector is adapted in the exposing positions thereof to cast a stationary reflection of said image on a sensitized sheet on the focal surface and in the idle position thereof to lie outside the camera chamber; manually controlled releasing means for allowing the reflector to move to the exposing position thereof, the reflector while moving into the exposing position thereof acting immediately upon its entrance into the camera chamber, to initiate the exposure of the sensitized sheet and also to release said shutter controlling means; said shutter controlling means acting after a predetermined time interval to release said shutter, said shutter after stopping the exposure acting to connect the power means to the power source; said power means acting to reset the shutter controlling means and also acting to move the reflector to its idle position which carries the shutter with it to reset the shutter.

4. In a camera assembly: a camera chamber, a lens adapted to cast an image within said chamber; a focal surface adapted to carry a sensitized sheet thereon; shutter controlling means; a settable shutter; power means; a power source; a movable reflector movable in its own plane, said plane being disposed with relation to said chamber that a perpendicular erected from it will bisect an angle formed by two perpendiculars erected from the lens and focal surface respectively into the camera chamber, whereby said reflector is adapted in the exposing position thereof to cast a stationary reflection of said image on a sensitized sheet on the focal surface and in the idle position thereof to lie outside the camera chamber; manually controlled means for allowing the reflector to move to the exposing position thereof, the reflector while moving into the exposing position thereof acting immediately upon its entrance into the camera chamber, to initiate the exposure of the sensitized sheet and also to release said shutter controlling means; said shutter controlling means acting after a predetermined time interval to release said shutter, said shutter after stopping the exposure acting to connect the power means to the power source; said power means acting to reset the shutter controlling means and also acting to move the reflector to its idle position which carries the shutter with it to reset the shutter; a source of sensitized material; feeding mechanism to discharge exposed sensitized material from said focal surface and to feed sensitized material onto the focal surface from said source activated by said power means.

5. In a camera assembly: a camera chamber; a focal surface adapted to carry thereon a sheet of sensitized material; a feeding roller; a discharging roller; guide means for guiding a sheet of sensitized material during passage from said feeding roller to said discharging roller, and for maintaining it in flat condition during its passage therebetween; said feeding and discharging rollers being disposed at opposite margins of said focal surface and spaced apart a distance greater than the length of a sheet of sensitized material; a cam roller disposed between the feeding and discharge rollers; said guide means having entrance portions into which the cam roller may enter to frictionally engage a sensitized sheet when in the guide means; said feeding roller acting to frictionally feed a sensitized sheet onto the focal plane, the cam roller acting to frictionally engage said sheet and center the same on the focal plane and subsequently to advance the sheet until it is engaged by the discharge roller which removes the sheet from the focal plane.

6. In a camera assembly: a camera chamber; a focal surface adapted to carry thereon a sheet of sensitized material; a feeding roller; a discharging roller; guide means for guiding a sheet of sensitized material during passage from said feeding roller to said discharging roller, and for maintaining it in flat condition during its passage therebetween; said feeding and discharging rollers being disposed at opposite margins of said focal surface and spaced apart a distance greater than the length of a sheet of sensitized material; a cam roller disposed between the feeding and discharge rollers; said guide means having entrance portions into which the cam roller may enter to frictionally engage a sensitized sheet when in the guide means; said feeding roller acting to frictionally feed a sensitized sheet onto the focal plane, the cam roller acting to frictionally engage said sheet and center the same on the focal plane and subsequently to advance the sheet until it is engaged by the discharge roller which removes the sheet from the focal plane; and means to change the original path of travel of the sensitized material so that the material in emerging from the camera assembly is in a rotated position with respect to the position it occupied when carried by the focal surface.

7. In a camera assembly: a camera chamber; a camera lens having an axis projecting into the chamber and adapted to cast a first picture image into said chamber; a focal surface having sensitized material thereon and adapted to receive said first image; first image exposing means to expose said first image on less than all of said sensitized material on the focal surface leaving a certain portion unexposed, comprising an opaque plane reflector having a light transmitting area, said reflector being rectilinearly movable along its own plane which is positioned with respect to the camera chamber so that a perpendicular erected from the active surface of said reflector will bisect the angle formed between said axis and a second perpendicular projecting into the camera chamber from the focal surface; a camera exposure stopping element adapted in the first position thereof to uncover almost all of said sensitized material on the focal surface except said portion and in the second position to cover almost all of said sensitized material on the focal surface except said portion; an identifying device adapted to cast a second image through the light transmitting area of the reflector, when said reflector is in operative position thereof within the camera chamber, upon said portion of the sensitized material on the focal surface, whereby an identifying exposure is produced on said portion while the camera exposure stopping element is in the second position thereof.

8. A camera assembly as claimed in claim 7 including means to move the exposing means to its active or operative position thereby permitting the identification exposure.

9. A camera assembly as claimed in claim 7 including means to move the exposing means to its active position thereby permitting the identification exposure; and third means to move the exposure stopping element, said third means operating independently of said second means whereby a uniform identifying exposure is secured regardless of the exposure made by the first image exposing means.

10. A camera assembly as claimed in claim 2 in which the shutter means includes a movable plate which in stopping the exposure of the sensitized material on the focal surface moves in the same direction as the plane reflector moves in initiating the exposure.

11. A camera assembly as claimed in claim 2 in which the shutter means includes a movable plate which in stopping the exposure moves in the same direction as the plane reflector moves in initiating the exposure and at substantially the same speed as the plane reflector.

12. A camera assembly as claimed in claim 2 in which the timing means is manually variable.

13. A camera assembly as claimed in claim 2 in which the timing means is automatically varied in correlation to movement of the lens as the same is brought to focus.

SAMUEL HERSHBERG.